Dec. 21, 1948.　　　　　E. F. KROHN　　　　2,456,789
AUXILIARY ROLLER GUIDE FOR TEMPLATES
Filed Dec. 7, 1946　　　　　　　　　　　　2 Sheets-Sheet 1

INVENTOR
*EMIL F. KROHN*
BY
ATTORNEYS

Dec. 21, 1948.  E. F. KROHN  2,456,789
AUXILIARY ROLLER GUIDE FOR TEMPLATES
Filed Dec. 7, 1946  2 Sheets-Sheet 2
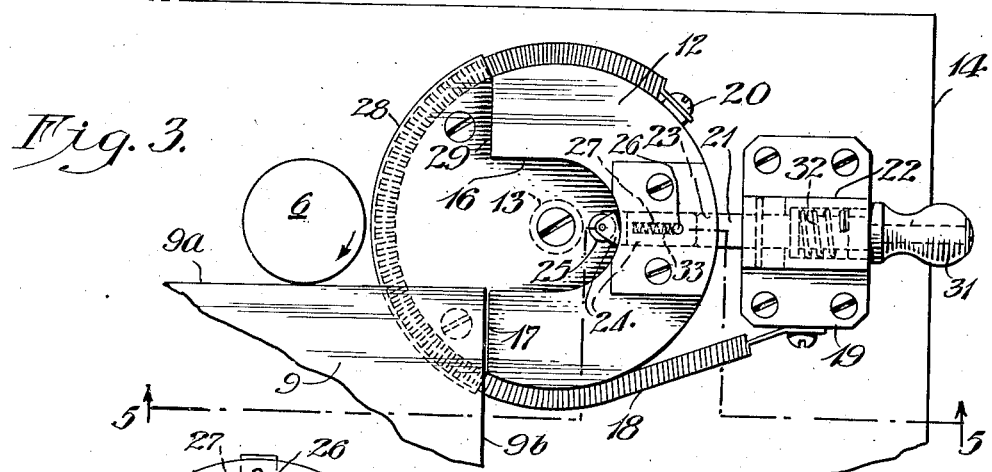
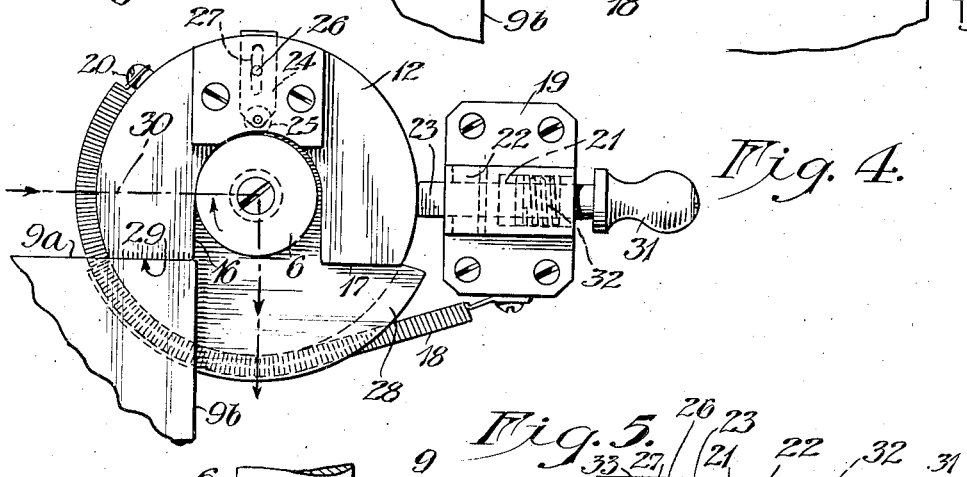
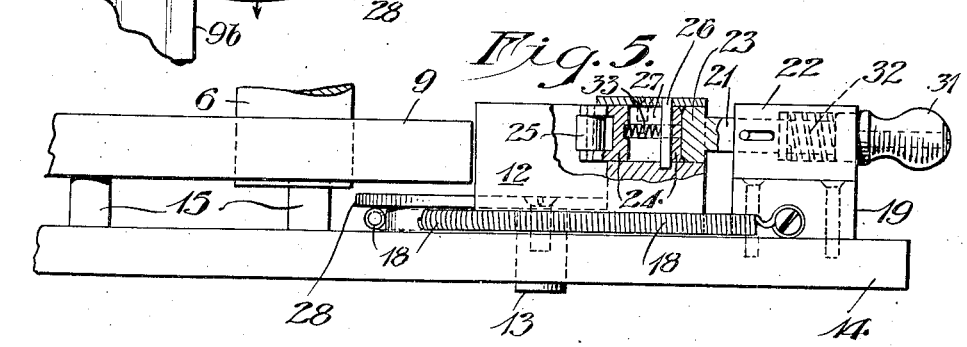
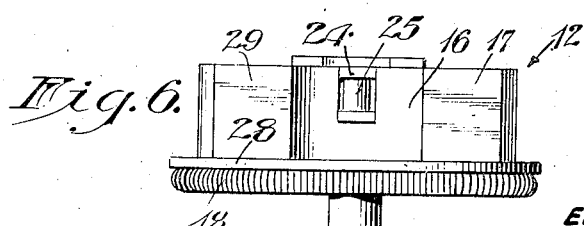
INVENTOR
EMIL F. KROHN
BY
ATTORNEYS Patented Dec. 21, 1948

2,456,789

UNITED STATES PATENT OFFICE 2,456,789

AUXILIARY ROLLER GUIDE FOR TEMPLATES

Emil F. Krohn, Centerville, Mich., assignor to Air Reduction Company, Incorporated, a corporation of New York Application December 7, 1946, Serial No. 714,754

7 Claims. (Cl. 33—23)

1

This invention relates to template controlled apparatus of the kind in which a cutting torch or other instrumentality carried by a portion of a machine or frame that is capable of universal movement in one plane is moved by a template follower having a motor-driven magnetic roller which rolls along an edge face of a template.

Ordinarily, the torch or other instrumentality will not exactly reproduce a sharp external corner of the template because as the roller turns around the corner the axis of the roller traces an arc the radius of which is the radius of the roller, and hence the torch, which moves according to the movement of the roller axis, will describe a similar arc instead of a sharp corner like that of the template. Various auxiliary guiding devices have been proposed for causing the roller to move around a sharp template corner in such a way that the roller axis executes a sharp or abrupt angular turn or a turn having such a small radius that it is, in effect, a sharp angular turn. For instance, the patent to D. L. Smith No. 2,062,380 discloses a pair of pivoted fingers operated automatically by the magnetic roller of the template follower to cause the roller axis to make an abrupt angular turn when the roller turns a sharp corner of the template, and the patents to J. L. Anderson Nos. 1,839,170 and 2,002,073 disclose a template follower having two coaxial magnetic rollers rotated in opposite directions, one of which cooperates with the edge face of the template and the second of which turns idly in space until the region of an external corner of the template is reached. There a guide is provided having an internally rounded corner which takes control in cooperation with the second roller, the first roller then turning idly until the corner is turned, whereupon the first roller again rolls in contact with the edge face of the template to which the control is restored. Since the radius of the internal corner on the guide need be only slightly greater than the radius of the second roller with which it cooperates, it is evident that as the roller rolls around the internal corner on the guide the axis of the roller traverses a path which has a very slight radius of curvature and hence to all intents and purposes is angular like the corner of the template.

The principal object of this invention is to provide improved means for causing the roller of a template follower to turn a sharp external corner of a template so that its axis will execute a sharp angular turn and describe a sharp corner corresponding to that of the template, but without necessitating the use of two magnetic rollers as in the Anderson patents, and by the use of only a single pivoted member as distinguished from the two pivoted fingers of the Smith patent. The apparatus, therefore, has the advantage of being simple in construction and operation and inexpensive to manufacture.

One embodiment of the invention is illustrated in the accompanying drawings, in which:

Fig. 3 is a plan view of the auxiliary roller-guiding means drawn to a larger scale than Fig. 1 and showing it in roller-receiving position;

Fig. 4 is a plan view corresponding to Fig. 3 but showing the auxiliary guiding means in roller-discharging position;

Fig. 5 is a section taken on the line 5—5 of Fig. 3; and

Fig. 6 is a front elevation of the auxiliary roller guiding means looking into the slot which receives the roller of the template follower.

Figure 1:
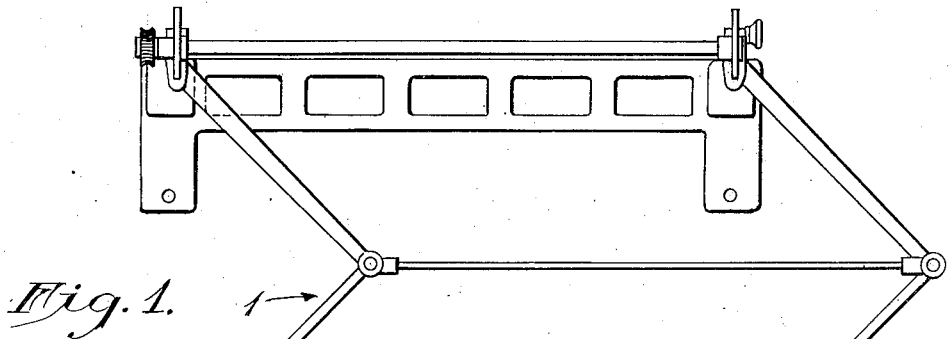
Figure 1 is a plan view of a universal torch cutting machine showing a corner of a template and the improved auxiliary guiding means for guiding the roller of the template follower around the template corner.
Figure 2:
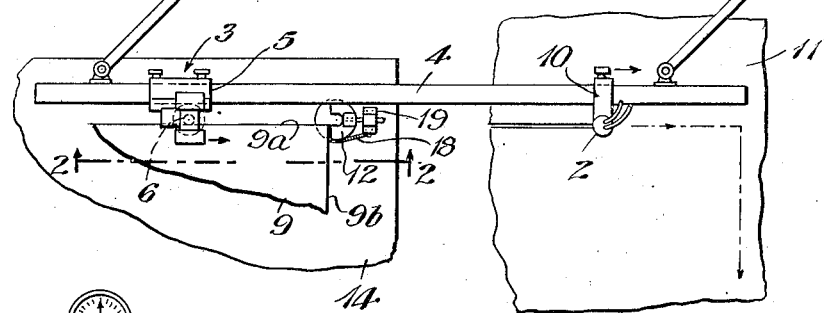
Fig. 2 is a vertical section taken on the line 2—2 of Fig. 1.

Referring first to Fig. 1, the jointed frame of a well known type of universal torch cutting machine is represented more or less diagrammatically at 1. A cutting torch 2 and a template follower 3 are mounted on the front bar 4 of the jointed frame and are movable in all directions in a horizontal plane. The template follower is shown in side elevation in Fig. 2. It may be of a well known type having a bracket 5 by which the template follower is clamped to the front bar 4 of the frame and having a magnetic roller 6 driven by an electric motor 7. The roller is magnetized by means of a coil in a casing 8. The magnetic roller rolls along the edge face of a steel template, a portion of which is represented at 9 (Fig. 1). The cutting torch 2, clamped on the front bar 4 by means of a bracket 10 (Fig. 1) cuts a workpiece, represented at 11, along a line the configuration of which is a reproduction of the outline of the template followed by the roller of the template follower.

The above-described jointed frame with its particular kind of template follower are merely representative of the various types of known universal motion machines with which my improved auxiliary roller guiding device is adapted to be used. It may be used in combination with the roller of any suitable type of template follower which is adapted to transmit motion to any suitable type of frame or the like whose portion to which the template follower is connected is capable of universal movement in one plane.

It is assumed that the template 9 has a sharp corner formed by the intersection of two contiguous edge faces 9$^a$ and 9$^b$ of the template and around which it is desired to guide the roller of the template follower so that the roller axis will describe a path which has an equally sharp corner. In the drawings the template is shown as having a corner whose included angle is 90°, but the invention is useful for guiding the roller around sharp template corners whose included angle is an obtuse angle.

Referring now to Figs. 3, 5 and 6 as well as to Fig. 1, the improved means for guiding the roller of the template follower around the sharp corner of the template comprises a block 12 of magnetic material which is pivotally mounted by means of a pivot post 13 (Fig. 5) to a base plate 14. The base plate 14 may also support the template 9, but the template is preferably elevated with respect to the base plate by means of posts 15. As best shown in Fig. 3, the axis of the pivot 13 is located externally of the template corner and is equidistant from the planes of the intersecting edge faces 9$^a$ and 9$^b$ of the template which form the corner, the axis of the pivot being spaced from each of said planes a distance which is substantially the same as the radius of the roller 6 of the template follower.

The block 12 has a slot 16 which is only slightly wider than the diameter of the roller 6 so that the roller can roll into the slot freely along one or the other of the side walls of the slot. When the block 12 is in roller-receiving position the opening in the slot faces the roller of the template follower as it rolls along the edge face 9$^a$ of the template and approaches the template corner, as shown in Fig. 3. In this position of the block 12 a shoulder 17 on the block abuts against the contiguous edge face 9$^b$ of the template. The block 12 is biased to its roller-discharging position, i. e. it is biased to turn in counterclockwise direction by means of a coil spring 18 which is secured at one end to a bracket 19, screwed to the base plate 14, and is secured at its other end to the block 12, as shown at 20, after making a partial turn around the block. The block is normally held against turning by means of a latch pin 21 which slides in a bearing portion 22 on the bracket 19. The portion of the latch pin 21 which slides in the bearing 22 is preferably circular in cross-section but it has an end portion 23 which is rectangular in cross-section and which is adapted to be received in an opening of corresponding shape at the rear of the pivoted block 12. Thus the end of the pin 21 normally holds the block 12 against rotation by the spring 18. The opening which receives the end of the latch pin is continued through the block until it reaches the slot 16, and in this portion of the opening there is guided a slide 24, the rear end of which abuts against the forward end of the latch pin when the parts are in the position shown in Fig. 3. At the forward end of the slide 24 there is a roller 25 adapted to be engaged by the roller 6 of the template follower just before the axis of the roller 6 coincides with the axis about which the block 12 pivots. If desired, the movement of the slide 24 in its opening may be limited by a pin 26 passing through a slot 27 in the slide.

As best shown in Figs. 3, 5 and 6 the spring 18 passes around the lower portion of the block 12 where it will not interfere with the passage of the roller of the template follower into the slot 16. The spring may pass under a plate 28 which projects a slight distance radially beyond the forward edge of the block 12 and serves to hold down the spring and keep it from interfering with the movement of the roller 6 into the roller-receiving slot in the block.

The operation of the apparatus is as follows: Assuming the parts are in the position shown in Fig. 3, the spring 18 tends to turn the block 12 in a counterclockwise direction, but the block is held against turning by reason of the fact that the end 23 of the latch pin 21 is engaged in the opening in the rear of the block. This is the roller-receiving position of the device, and in this position the opening in the slot 16 faces the oncoming roller of the template follower and one side wall of the slot is substantially flush with and forms in effect a continuation of the edge face 9$^a$ of the template along which the roller 6 rolls as it approaches the template corner. When the roller rolls into the slot 16 of the block 12 it engages the roller 25 on the slide 24 and starts moving this side rearwardly. When the roller of the template follower has cleared the edge face 9$^a$ of the template far enough to be substantially tangent to the edge face 9$^b$ the slide 24 will have been moved rearwardly far enough to bring the end face of the latch pin 21 substantially flush with the rear face of the block 12, whereupon the block will be released and the spring 18 will quickly turn the block to the roller-discharging position shown in Fig. 4. A second shoulder 29 of the block 12, corresponding to the above described shoulder 17, arrests the rotation of the block when it reaches its roller-discharging position in which the second side wall of the slot 16 is now substantially flush with and constitutes in effect a continuation of the edge face 9$^b$ of the template. The roller of the template follower now rolls along this side wall of the slot and rolls out of the slot into engagement with the edge face 9$^b$ of the template. It will therefore be seen that the path traced by the axis of the roller of the template follower, represented by the dot-and-dash line 30 in Fig. 4, has a sharp corner corresponding to the sharp corner of the template. To reset the parts the block 12 is turned by hand back to the position shown in Fig. 3 and the end of the latch pin 21 is moved into the opening in the rear of the block by means of a handle 31 at the rear end of the latch pin. This advances the slide 24 to its operative position shown in Fig. 3 in which its forward roller-carrying end projects into the rear end of the slot 16. If desired, the latch pin 21 can be biased to the position shown in Fig. 3 by a light spring 32 so that the end of the pin will move to its latching position when the block 12 is turned by hand to the position shown in Fig. 3. Also if desired, the slide 24 may be biased to the position shown in Fig. 3 by a light spring 33.

If the roller of the template follower travels around the template in the opposite direction from that above described so that it makes a lefthand turn at the template corner instead of a righthand turn then, of course, the spring 18 should be wound around the block 12 in the opposite direction so as to bias the block in a clockwise direction and the roller-receiving position of the device will then be the position shown in Fig.

4 and the roller-discharging position will be the position shown in Fig. 3.

While the block 12 is preferably automatically turned from its roller-receiving position to its roller-discharging position as above described, it may if desired be turned manually by the operator when the roller of the template follower reaches a position in the slot 16 in which the axis of the roller substantially coincides with the pivot axis of the block 12. The automatically operating device is of course more practical. In either case the guiding of the roller around the template corner so that the axis of the roller traverses a path having a sharp corner corresponding to the sharp corner of the template causes the torch or other instrumentality carried by the front bar of a universally movable frame to cut along a path which has a sharp corner corresponding exactly to the sharp corner of the template. If the template has several sharp corners it will be necessary, of course, to use a corresponding number of the auxiliary roller-guiding devices—one at each of the sharp template corners.

The device may be readily adapted for use with a template corner whose included angle is greater than 90° by spacing and inclining the stop faces 17 and 29 on the block 12 to accommodate the particular angle of the template corner.

I claim:

1. The combination of a template follower having a roller and means to rotate the same, a template having edge faces in contact with which said roller is adapted to roll and having a sharp corner at the intersection of two of the edge faces, guiding means for directing the movement of the roller around the corner comprising a member having an opening adapted to receive said roller when it runs off the first of said intersecting edge faces of the template, said member being mounted to pivot about an axis so located with respect to the template corner that it substantially coincides with the axis of the roller when the roller has cleared the first of the intersecting edge faces of the template far enough to be substantially tangent to the second of the intersecting edge faces of the template, and means for turning the member from a roller-receiving position in which said opening is in position to receive the roller to a roller-discharging position in which the opening then directs the roller along the second of said intersecting edge faces of the template and changes the path of travel of the roller axis abruptly so that it has a corner corresponding in sharpness and angularity to that of the template corner.

2. The combination of a template follower having a roller and means to rotate the same, a template having edge faces in contact with which said roller is adapted to roll and having a sharp corner at the intersection of two of the edge faces, guiding means for directing the movement of the roller around the corner comprising a member having a slot only slightly wider than the diameter of said roller to receive the roller when it runs off the first of said intersecting edge faces of the template, said member being mounted to pivot about an axis so located with respect to the template corner that it substantially coincides with the axis of rotation of the roller when the roller has cleared the first of the intersecting edge faces of the template far enough to be substantially tangent to the second of the intersecting edge faces of the template, and means for turning said member from its roller-receiving position in which said slot is in position to receive said roller to a roller-discharging position in which the slot then directs the roller along the second of the intersecting edge faces of the template and changes the path of travel of the roller axis abruptly so that it has a corner corresponding in sharpness and angularity to that of the template corner.

3. The combination of a template follower having a roller and means to rotate the same, a template having edge faces in contact with which said roller is adapted to roll and having a sharp corner at the intersection of two of the edge faces, guiding means for directing the movement of the roller around the corner of the template so that the path followed by the roller axis will have a corner corresponding in sharpness and angularity to that of the template corner, said guiding means comprising a member pivoted to turn about an axis which extends in the same direction as the roller axis and which is located externally of said template corner equidistant from the planes of said intersecting edge faces and spaced from each of such planes a distance substantially equal to the radius of said roller, said member having a slot into which the roller can move when it rolls off the first of said intersecting edge faces of the template, one side of said slot being substantially flush with such edge face and forming in effect an extension thereof when said member is in roller-receiving position, means for turning said member about the axis of its pivot from its roller-receiving position in which said slot is in position to receive the roller to a roller-discharging position, the other side of said slot being substantially flush with the second of said intersecting edge faces of the template when said member is in its roller-discharging position, and a stop for limiting the turning movement of said member when it reaches its roller-discharging position.

4. The combination of a template follower having a roller and means to rotate the same, a template having edge faces in contact with which said roller is adapted to roll and having a sharp corner at the intersection of two of the edge faces, guiding means for directing the movement of the roller around the corner comprising a member having an opening adapted to receive said roller when it runs off the first of said intersecting edge faces of the template, said member being mounted to pivot about an axis so located with respect to the template corner that it substantially coincides with the axis of the roller when the roller has cleared the first of the intersecting edge faces of the template far enough to be substantially tangent to the second of the intersecting edge faces of the template, and means for turning the member from a roller-receiving position in which said opening is in position to receive the roller to a roller-discharging position in which the opening then directs the roller along the second of said intersecting edge faces of the template and changes the path of travel of the roller axis abruptly so that it has a corner corresponding in sharpness and angularity to that of the template corner, said means for turning the member comprising biasing means for biasing the member to its roller-discharging position, and means normally holding the member in its roller-receiving position, said last-named means being actuatable by the roller when the roller enters said opening in the member and adapted when the roller axis substantially coincides with the pivot axis of said member to release the member and thereby permit the biasing means to turn it to its roller-discharging position.

5. The combination of a template follower having a roller and means to rotate the same, a template having edge faces in contact with which said roller is adapted to roll and having a sharp corner at the intersection of two of the edge faces, guiding means for directing the movement of the roller around the corner comprising a member having an opening adapted to receive said roller when it runs off the first of said intersecting edge faces of the template, said member being mounted to pivot about an axis so located with respect to the template corner that it substantially coincides with the axis of the roller when the roller has cleared the first of the intersecting edge faces of the template far enough to be substantially tangent to the second of the intersecting edge faces of the template, means for turning the member from a roller-receiving position in which said opening is in position to receive the roller to a roller-discharging position in which the opening then directs the roller along the second of said intersecting edge faces of the template and changes the path of travel of the roller axis abruptly so that it has a corner corresponding in sharpness and angularity to that of the template corner, said means for turning the member comprising a coil spring which biases the member to its roller-discharging position, and a latch normally holding said member in its roller-receiving position but arranged to be actuated by the roller when the roller enters said opening in the member and adapted when the roller axis substantially coincides with the pivot axis of the member to release the member and thereby permit the spring to turn it to its roller-discharging position.

6. The combination of a template follower having a roller and means to rotate the same, a template having edge faces in contact with which said roller is adapted to roll and having a sharp corner at the intersection of two of the edge faces, guiding means for directing the movement of the roller around the corner comprising a member having a slot only slightly wider than the diameter of said roller to receive the roller when it runs off the first of said intersecting edge faces of the template, said member being mounted to pivot about an axis so located with respect to the template corner that it substantially coincides with the axis of rotation of the roller when the roller has cleared the first of the intersecting edge faces of the template far enough to be substantially tangent to the second of the intersecting edge faces of the template, means for turning said member from its roller-receiving position in which said slot is in position to receive said roller to a roller-discharging position in which the slot then directs the roller along the second of the intersecting edge faces of the template and changes the path of travel of the roller axis abruptly so that it has a corner corresponding in sharpness and angularity to that of the template corner, said means for turning the member comprising a coil spring which biases the member to its roller-discharging position, and a latch which normally retains the member in its roller-receiving position, said latch being actuatable by the roller when the roller moves into the slot in the member and adapted when the roller reaches a position in which its axis substantially coincides with the pivot axis of said member to release the member and thereby permit said spring to turn it to its roller-discharging position.

7. The combination of a template follower having a roller and means to rotate the same, a template having edge faces in contact with which said roller is adapted to roll and having a sharp corner at the intersection of two of the edge faces, guiding means for directing the movement of the roller around the corner of the template so that the path followed by the roller axis will have a corner corresponding in sharpness and angularity to that of the template corner, said guiding means comprising a member pivoted to turn about an axis which extends in the same direction as the roller axis and which is located externally of said template corner equidistant from the planes of said intersecting edge faces and spaced from each of such planes a distance substantially equal to the radius of said roller, said member having a slot into which the roller can move when it rolls off the first of said intersecting edge faces of the template, one side of said slot being substantially flush with such edge face and forming in effect an extension thereof when said member is in roller-receiving position, means for turning said member about the axis of its pivot from its roller-receiving position in which said slot is in position to receive the roller to a roller-discharging position, the other side of said slot being substantially flush with the second of said intersecting edge faces of the template when said member is in its roller-discharging position, a stop for limiting the turning movement of said member when it reaches its roller-discharging position, said means for turning the member comprising a coil spring which biases the member to its roller-discharging position, and a latch which normally retains the member in its roller-receiving position, said latch being actuatable by the roller when the roller moves into the slot in the member and adapted when the roller reaches a position in which its axis substantially coincides with the pivot axis of said member to release the member and thereby permit said spring to turn it to its roller-discharging position.

EMIL F. KROHN.

No references cited.